United States Patent [19]

McInerney et al.

[11] Patent Number: 5,679,141

[45] Date of Patent: Oct. 21, 1997

[54] MAGENTA INK JET PIGMENT SET

[75] Inventors: Elizabeth McInerney; David Joseph Oldfield; Douglas Eugene Bugner, all of Rochester; Alexandra DiLauro Bermel, Pittsford; Domenic Santilli, Webster, all of N.Y.

[73] Assignee: Eastman Kodak Company, Rochester, N.Y.

[21] Appl. No.: 699,962

[22] Filed: Aug. 20, 1996

[51] Int. Cl.$^6$ .................................................. C09D 11/16
[52] U.S. Cl. .................... 106/20 D; 106/20 R; 106/400; 106/410; 106/495; 106/497; 106/498; 347/86; 358/502; 364/DIG. 2
[58] Field of Search ................ 106/20 R, 20 D, 106/400, 401, 410, 495, 497, 498; 347/86; 358/502; 364/DIG. 2

[56] References Cited

U.S. PATENT DOCUMENTS

| | | | |
|---|---|---|---|
| 4,211,775 | 7/1980 | Regan | 430/37 |
| 4,758,885 | 7/1988 | Sasaki et al. | 358/80 |
| 4,765,838 | 8/1988 | Ohata et al. | 106/20 D |
| 4,818,285 | 4/1989 | Causley et al. | 106/20 D |
| 4,905,039 | 2/1990 | Terashita | 355/35 |
| 4,975,737 | 12/1990 | Murooka et al. | 355/77 |
| 5,145,519 | 9/1992 | Kappele | 106/20 D |
| 5,185,034 | 2/1993 | Webb et al. | 106/20 D |
| 5,200,667 | 4/1993 | Iwasaki et al. | 313/478 |
| 5,476,746 | 12/1995 | Janssens et al. | 430/200 |

OTHER PUBLICATIONS

Inui, M. "A Fast Algorithm for Computin Color Gamuts of Subtractive Colour Mixtures", J. Photog. Sci., 38, pp. 163, 164. Dec. 1990.

The Reproduction of Color, Hunt 5th Ed. pp. 177–192.

"The Color Gamut Obtainable by the Combination of Subtractive Color Dyes. Optimum Absorption Bands as Defined by Nonlinear Optimization Technique", J. Imaging Science, 30, 9–12; by N. Ohta.

"Brightness and Hue of Present–Day Dyes in Relation to Colour Photography" by M.E.Clarkson and T.Vickerstaff; Photo.J.88b, 26 (1948).

Ohta,N. "The Color Gamut Obtainable by the Combination of Subtractive Color Dyes", Photographic Science And Engineering, vol. 26, No. 5, Sep./Oct. 1982, pp. 228–231.

Ohta,N. "The Color Gamut Obtainable by the Combination of Subtractive Color Dyes", Photographic Science And Engineering, vol. 15, No. 5, Sep./Oct. 1971, pp. 399–415.

Ohta,N. "The Color Gamut Obtainable by the Combination of Subtractive Color Dyes", Photographic Science and Engineering, vol. 16, No. 3, May–Jun. 1972, pp. 208–213.

*Primary Examiner*—Mark L. Bell
*Assistant Examiner*—Scott L. Hertzog
*Attorney, Agent, or Firm*—Arthur E. Kluegel

[57] ABSTRACT

The invention provides an ink jet pigment set comprising a magenta pigment, a yellow pigment, and a cyan pigment wherein the normalized spectral transmission density distribution curve of the magenta pigment has a density between 0.25 and 0.93 at 520 nm, a density between 0.9 and 1.0 at 540 nm, and a density between 0.9 and 1.0 at 560 nm. Such a pigment set enables an increase in the color gamut obtainable for ink jet imaging.

21 Claims, No Drawings

MAGENTA INK JET PIGMENT SET

FIELD OF THE INVENTION

This invention relates to ink jet pigment sets. More specifically, it relates to such pigment sets employing a magenta pigment having a transmittance spectra which increases the gamut of colors possible.

Background of the Invention

Color gamut is an important feature of color printing and imaging systems. It is a measure of the range of colors that can be produced using a given combination of colorants. It is desirable for the color gamut to be as large as possible. The color gamut of the imaging system is controlled primarily by the absorption characteristics of the set of colorants used to produce the image. Subtractive imaging systems typically employ three or more colorants, typically including, at least, cyan, magenta, and yellow. It is also common for such systems to include an achromatic (neutral density) colorant such as black.

Images may comprise pictorial, graphic, or text or a composite of two or more of these as subjects. The ability to produce an image containing any particular color is limited by the color gamut of the system and materials used to produce the image. Thus when pigments are used in ink jet printing, both image reproduction and the creation of original images are limited by the color gamut that the system and materials can produce.

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks employed may utilize either pigments or dyes as the colorants. In spite of the desire to maximize the color gamut obtainable from pigment sets for ink jet printing, the results have not been all together satisfactory.

Color gamut is often thought to be maximized by the use of so-called "block dyes". In *The Reproduction of Colour* 4th ed., R. W. G. Hunt, pp 135–144, it has been suggested that the optimum gamut could be obtained with a subtractive three-color system using three theoretical block dyes where the blocks are separated at approximately 490 nm and 580 nm. This proposal is interesting but cannot be implemented for various reasons. In particular, there are no real colorants corresponding to the proposed block dyes.

Variations in the block dye concept are advanced by Clarkson, M., E., and Vickerstaff, T., in "Brightness and Hue of Present-Day Dyes in Relation to Colour Photography," Photo. J. 88b, 26 (1948). Three example shapes are given by Clarkson and Vickerstaff: Block, Trapezoidal, and Triangular. The authors conclude, contrary to the teachings of Hunt, that a trapezoidal absorption spectra may be preferred to a vertical sided block dye. Again, dyes having these trapezoidal spectra shapes are theoretical and are not available in practice.

Finally, both commercially available dyes and theoretical dyes were investigated in "The Color Gamut Obtainable by the Combination of Subtractive Color Dyes. Optimum Absorption Bands as Defined by Nonlinear Optimization Technique," I. Imaging Science, 30, 9–12. The author, N. Ohta, deals with the subject of real colorants and notes that the existing curve for a typical magenta dye, as shown in the publication, is the optimum absorption curve for magenta dyes from a gamut standpoint.

In spite of the foregoing teachings relative to color gamut, the pigment sets including magenta pigments which have been employed in ink jet printing have not provided the range of gamut desired for modern imaging. It is therefore a problem to be solved to provide an ink jet pigment set which enables an increase in color gamut over the gamut obtainable from the ink jet pigment sets heretofore suggested for ink jet printing.

SUMMARY OF THE INVENTION

The invention provides an ink jet pigment set comprising a magenta pigment, a yellow pigment, and a cyan pigment wherein the normalized spectral transmission density distribution curve of the magenta pigment has a density between 0.25 and 0.93 at 520 nm, a density between 0.9 and 1.0 at 540 nm, and a density between 0.9 and 1.0 at 560 nm. The invention further provides an ink jet cartridge comprising the specified pigment set, an ink jet system having reservoirs containing the pigment set, and a method of forming an image using the ink jet pigment set.

The ink jet pigment set of the invention provides increased color gamut compared to the ink jet pigment sets heretofore available.

Detailed Description of the Invention

The invention is summarized in the preceding section. The pigment set of the invention employs subtractive color imaging. In such imaging, a color image is formed by generating a combination of cyan, magenta and yellow colorants in proportion to the amounts of exposure of red, green, and blue light respectively. The object is to provide a reproduction that is pleasing to the observer. In any event, every color in the reproduced image is composed of a combination of the cyan, magenta and yellow image colorants. The relationship of the original color to the reproduced color is a combination of many factors. It is, however, limited by the color gamut achievable by the multitude of combinations of cyan, magenta and yellow colorants used to generate the final image.

In addition to the individual colorant characteristics, it is necessary to have cyan, magenta and yellow colorants that have preferred absorption maxima relative to one another and that have absorption band shapes which function together to provide an optimum overall color gamut.

The CIELAB metrics, a*, b*, and L*, when specified in combination, describe the color of an object (under fixed viewing conditions), whether it be red, green, blue, etc. The measurement of a*, b*, and L* are well documented and now represent an international standard of color measurement. (The well known CIE system of color measurement was established by the International Commission on Illumination in 1931 and was further revised in 1971. For a more complete description of color measurement refer to "Principles of Color Technology, 2nd Edition by F. Billmeyer, Jr. and M. Saltzman, published by J. Wiley and Sons, 1981.)

Simply stated, a* is a measure of how green or magenta the color is (since they are color opposites) and b* is a measure of how blue or yellow a color is. From a mathematical perspective, a* and b* are determined as follows:

$$a^* = 500\{(X/X_n)^{1/3} - (Y/Y_n)^{1/3}\}$$

$$b^* = 200\{(Y/Y_n)^{1/3} - (Z/Z_n)^{1/3}\}$$

where X, Y and Z are the tristimulus values obtained from the combination of the visible reflectance spectrum of the object, the illuminant source (i.e. 5000° K.) and the standard observer function.

Simply stated, L* is a measure of how light or dark a color is. L*=100 is white. L*=0 is black. The value of L* is a function of the tristimulus value Y, thus $$L^* = 116(Y/Y_n)^{1/3} - 16$$

As used herein, the color gamut of a colorant set is the sum total of the nine slices of color space represented as the sum of a*×b* areas of 9L* slices (L*=10, 20, 30, 40, 50, 60, 70, 80, and 90) for the colorant or colorant set being tested. Color gamut may be obtained through measurement and estimation from a large sample of color patches (very tedious and time-consuming) or, as herein, calculated from the measured absorption characteristics of the individual colorants using the techniques described in J. Photographic Science, 38, 163 (1990).

The absorption characteristics of a given colorant will vary to some extent with a change in colorant amount (transferred density). This is due to factors such as a measurement flare, colorant—colorant interactions, colorant-receiver interactions, colorant concentration effects, and the presence of color impurities in the media. However, by using characteristic vector analysis (sometimes refereed to as principal component analysis or eigenvector analysis), one can determine a characteristic absorption curve that is representative of the absorption characteristics of the colorant over the complete wavelength and density ranges of interest. This technique is described by J. L. Simonds in the Journal of the Optical Society of America, 53 (8), 968–974 (1963).

The characteristic vector for each colorant is a two-dimensional array of optical transmission density and wavelength normalized to a peak height of 1.0. The characteristic vector is obtained by first measuring the reflection spectra of test images comprising patches of varying densities or percentage coverage of the colorant, including 100% coverage (Dmax) and 0% coverage (Dmin). The spectral reflection density of the Drain is then subtracted from the spectral reflection density of each color patch. The resulting Drain subtracted reflection densities are then converted to transmission density by passing the density data through the DR/DT curve. Characteristic vector analysis is then used to find one transmission density curve for each colorant which, when scaled in transmission density space, converted to reflection density, and added to Drain, gives a best fit to the measured spectral reflectance data. This characteristic vector is used herein to both specify the spectral absorption characteristics of the colorant and to calculate the color gamut of each imaging system employing the colorant.

It is noted that the terms "pigment" and "dye" are often used as distinctions between different colorant types, but the distinction between the two is not always clear. For purposes of this specification, a pigment shall mean any dispersible solid particle colorant requiring a binder to adhere to a substrate. The term "dye" shall be deemed to include all colorants that are not pigments by this definition.

Many of the pigments identified herein are identified by pigment names corresponding to those given in the Color Index ("CI"), 3rd Ed. of the Society of Dyers and Colorists, Research Triangle Park, North Carolina, U.S.A.

As noted in the Summary of the Invention, the magenta pigment has a density between 0.90 and 1.0 at 560 nm, a density between 0.9 and 1.0 at 540 nm, and a density between 0.25 and 0.93 at 520 nm. In a preferred embodiment, the density is also between 0.25 and 0.86 at 510 nm and, more preferably, is also between 0.25 and 0.79 at 500 nm.

The spectra herein are considered to be yellow if they have a maximum absorbance between 400 and 500 nm, magenta if they have a maximum between 500 and 600 nm, and cyan if they have a maximum between 600 and 700 nm. The curve shape is a function of many factors and is not merely a result of the selection of a particular colorant or pigment compound. Further the spectral curve may represent the composite absorbance of two or more compounds. For example, if one particular compound provides the desired spectral curve, the addition of further compounds of the same color may provide a composite curve which remains within the desired range. Thus, when two or more colorants or pigments of a particular color are employed, the spectral curve for the "magenta", "yellow" or "cyan" colorant, for purposes of this invention, means the composite curve obtained from these two or more colorants.

The spectral curve of a given pigment can be affected by the particle size and other pigment system components (solvents, dispersing agents etc.). These parameters are selected to provide the desired spectral curve. Suitably, the particle size of the inventive pigments is such that the mean particle size is no more than 90 nm with at least 90% of the particles being less than 150 nm. Desirably, 90% of the particles are less than 50 nm with 50% less than 20 nm and 10% less than 15 nm.

A magenta pigment useful in the invention is CI Pigment Red 122, quinacridone. The chemical description of the comparative magenta pigments are generically the same but do not exhibit the same spectral density curves as the invention pigments. It is believed that this difference is accounted for in this instance by differences in particle size distribution.

The process of preparing inks from pigments commonly involves two steps: (a) a dispersing or milling step to break up the pigment to the primary particle, and (b) dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

There are many different types of materials which may be used as milling media, such as glasses, ceramics, metals, and plastics. In a useful embodiment, the grinding media can comprise particles, preferably substantially spherical in shape, e.g., beads, consisting essentially of a polymeric resin.

In general, polymeric rosins suitable for use as milling media are chemically and physically inert, substantially free of metals, solvent and monomers, and of sufficient hardness and friability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Derlinä, vinyl chloride polymers and copolymers, polyurethanes, polyamides, poly (tetrafluoroethylenes), e.g., Teflonä, and other fluoropolymers, high density polyethylenes, polypropylenes, cellulose ethers and esters such as cellulose acetate, poly(hydroxyethylmethacrylate), poly (hydroxyethyl acrylate), silicone containing polymers such as polysiloxanes and the like. The polymer can be biodegradable. Exemplary biodegradable polymers include poly (lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly (phosphazenes). The polymeric resin can have a density from 0.9 to 3.0 g/cm$^3$. Higher density resins are especially useful inasmuch as it is believed that these provide more efficient particle size reduction. Especially useful are crosslinked or uncrosslinked polymeric media based on styrene.

Milling can take place in any suitable grinding mill. Suitable mills include an airier mill, a roller mill, a ball mill, an attritor mill and a bead mill. A high speed mill is particularly useful.

By high speed mill we mean milling devices capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller revolutions per minute, $\pi$, and the impeller diameter. Sufficient milling media velocity is achieved, for example, in Cowles-type saw tooth impeller having a diameter of 40 mm when operated at 9,000 rpm. Useful proportions of the milling media, the pigment, the liquid dispersion medium and dispersant can vary within wide limits and depends, for example, upon the particular material selected and the size and density of the milling media etc. The process can be carded out in a continuous or batch mode.

Batch Milling

A slurry of <100 mm milling media, liquid, pigment and dispersant is prepared using simple mixing. This slurry may be milled in conventional high energy batch milling processes such as high speed attritor mills, vibratory mills, ball mills, etc. This slurry is milled for a predetermined length of time to allow comminution of the active material to a minimum particle size. After milling is complete, the dispersion of active material is separated from the grinding media by a simple sieving or filtration.

Continuous Media Recirculation Milling

A slurry of <100 mm milling media, liquid, pigment and dispersant may be continuously recirculated from a holding vessel through a conventional media mill which has a media separator screen adjusted to >100 mm to allow free passage of the media throughout the circuit. After milling is complete, the dispersion of active material is separated from the grinding media by simple sieving or filtration.

With either of the above modes the useful amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at 1 to 50 weight %, excluding the milling media. The weight ratio of pigment to dispersant is 20:1 to 1:2. The high speed mill is a high agitation device, such as those manufactured by Morehouse-Cowles, Hockmeyer et al.

The dispersant is another important ingredient in the mill grind. Useful dispersants for aqueous ink jet inks include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794. Other patents referred to above in connection with pigment availability also disclose a wide variety of dispersant to select from. The dispersant used in the examples is sodium N-methyl-N-oleyl taurate (OMT).

The milling time can vary widely and depends upon the pigment, mechanical means and residence conditions selected, the initial and desired final particle size, etc. For aqueous mill grinds using the useful pigments, dispersants, and milling media described above, milling times will typically range from 1 to 100 hours. The milled pigment concentrate is preferably separated from the milling media by filtration.

The aqueous carrier medium is water or a mixture of water and at least one water miscible co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-miscible co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or all-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

Ink Preparation

In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 10%, preferably approximately 0.1 to 5%, by weight of the total ink composition for most thermal ink jet printing applications. If an inorganic pigment is selected, the ink will tend to contain higher weight percentages of pigment than with comparable inks employing organic pigments, and may be as high as approximately 75% in come cases, since inorganic pigments generally have higher specific gravities than organic pigments.

The amount of aqueous carrier medium is in the range of approximately 70 to 98 weight %, preferably approximately 90 to 98 weight %, based on the total weight of the ink. A mixture of water and a polyhydric alcohol, such as diethylene glycol, is useful as the aqueous carrier medium. In the case of a mixture of water and diethylene glycol, the aqueous carrier medium usually contains from about 30% water/70% diethylene glycol to about 95% water/5% diethylene glycol. Useful ratios are approximately 60% water/40% diethylene glycol to about 95% water/5% diethylene glycol. Percentages are based on the total weight of the aqueous carrier medium.

Suitable block copolymers that may be used in this invention are added in a concentration of 0.2 to 5 weight percent as previously stated if not already included in the mill grind. Examples are block copolymers of ethylene oxide and propylene oxide having a structure selected from the group consisting of:

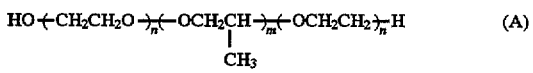

(A)

having a number average molecular weight of 4000 to 15,000 and the ratio of n/m of 5 to 10;

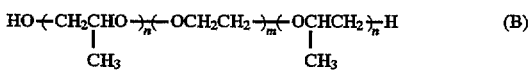

(B)

having a number average molecular weight of 4000 to 9000 and a ratio of n/m of 8 to 15.

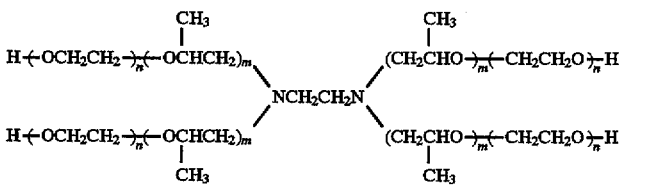

(C)

having a number average molecular weight of 5,000 to 40,000 and a ratio of n/m of 5 to 10; and

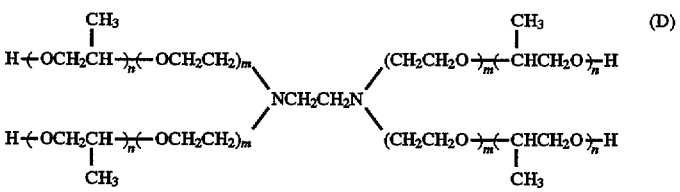

(D)

having a number average molecular weight of 8,000 to 20,000 and a ratio of n/m of 8 to 15. The structure may be either linear triblock (ABA or BAB) morphology in which A represents polyethylene oxide and B the polypropylene oxide. Useful block copolymers also include branched (AB or BA) tetra functional type copolymers derived from the sequential addition of propylene oxide and ethylene oxide to ethylenediamine.

Solid block copolymers (A), (B), (C) and (D), having the defined molecular weights, and the blocks of polyethylene oxide and polypropylene oxide are commercially available from BASF Corporation under the name Pluronic® and Tetronic® surfactants. Block copolymer concentration in the inks is most useful from 0.2 to 5 weight percent, based on the total weight of the ink composition. Concentrations less than 0.2 weight percent. Concentration below 0.2 weight percent have no effects. At concentrations higher than 5% image quality deteriorates.

Examples of useful block copolymers, together with theft respective Pluronic® trade designations, number average molecular weights, number of each block copolymer units and their relative ratios in the block copolymer are presented below. Examples of ABA block copolymers according to structure I are:

| Pluronic® Designation | MW | Each n | m | n/m |
|---|---|---|---|---|
| F38 | 4k | 40 | 10 | 8 |
| F68 | 8k | 80 | 20 | 8 |
| F108 | 14K | 140 | 40 | 7 |

Examples of BAB block copolymers according to structure II are:

| Pluronic® Designation | MW | Each n | m | n/m |
|---|---|---|---|---|
| 10R8 | 5K | 90 | 15 | 6 |
| 17R8 | 7K | 135 | 23 | 6 |
| 25R8 | 9K | 160 | 30 | 6 |

Branched (AB or BA) block copolymers are available under the tradename TETRONIC from BASF Corporation. Tradename designations falling within the structures (C) and (D) are TETRONIC 707, 1107 and 1508.

Jet velocity, separation length of the droplets, drop size and stream stability are greatly affected by the surface tension and the viscosity of the ink Pigmented ink jet inks suitable for use with ink jet printing systems should have a surface tension in the range of about 20 dynes/cm to about 60 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments. Anionic and cationic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

Acceptable viscosities are no greater than 20 centipoise, and preferably in the range of about 1.0 to about 10.0, preferably 1.0 to 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A humectant, or co-solvent, is commonly added to help prevent the ink from drying out or crusting in the orifices of the printhead. A penetrant may also be optionally added to help the ink penetrate the receiving substrate, especially when the substrate is a highly sized paper. A biocide, such as Proxel® GXL from Zeneca Colours may be added at a concentration of 0.05–0.5 weight percent to prevent unwanted microbial growth which may occur in the ink over time. Additional additives which may optionally be present in ink jet inks include thickeners, conductivity enhancing agents, anti-kogation agents, drying agents, and defoamers.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

Ink jet pigment sets comprising the three- or four- (including an achromatic, usually black, pigment) member sets of pigments of the present invention can be used in any of the popular ink jet printing systems, including thermal or piezoelectric drop-on-demand printers and continuous ink jet printers. Of course, the specific ink formulations will vary depending upon the type of ink jet printing system.

The inks of the present invention are most advantageously used in conjunction with photographic quality ink jet paper, such as that manufactured and sold by the Eastman Kodak Company. This is because the optical density and color gamut are enhanced when the inks of the present invention are deposited on this type of paper. However, these inks will also be useful for printing on a variety of transparent and opaque films, and even on so-called plain papers.

Examples of suitable cyan and yellow pigments usable in combination with the magenta pigment of the invention are shown in Table I. The yellow pigment is typically a non-benzidine yellow such as CI yellow 74, 138, 139, 154, 180, or 185. Suitably, the yellow pigment has a normalized transmission density between 0.9 and 1.0 at 450 nm and between 0.8 and 1.0 at 470 nm. Preferably, the yellow density is also between 0.5 and 0.9 at 490 nm. The cyan pigment is typically one having a normalized transmission density between 0.33 and 0.9 at 580 nm and suitably between 0.5 and 0.89 at 590 nm, between 0.66 and 0.94 at 600 nm, and between 0.83 and 1.0 at 610 nm.

Examples

The following examples will further illustrate the invention. The pigments tested are as identified in Table I. $Y_6$ is a preferred yellow pigment of the invention.

TABLE I

| Sample | Type | Color | Description |
|---|---|---|---|
| $C_1$ | — | Cyan | Ohta optimum cyan colorant |
| $C_2$ | — | " | CI Pigment Blue 15 supplied by Independent Ink, Inc, Gardena CA 90249 |
| $C_3$ | — | " | CI Pigment Blue 15 supplied by Graphic Utilities, San Jose CA 95131 |
| $C_4$ | — | " | Brilliant Ink CI Pigment Blue 15 supplied by Dataplot CAD CAM Vertriebsgesellschaft mb, Henstedt-Ulzburg, Germany |
| $C_5$ | — | " | DuraInk CI Pigment Blue 15 supplied by Ahearn and Soper Co., Inc, Manchester NH 03101 |
| $MI_1$ | Inv | Magenta | Pigment Red 122 supplied by Sun Chemical Corporation as Sunfast Quinacridone Pigment |
| $MC_1$ | Comp | " | Ohta optimum magenta colorant |
| $MC_2$ | Comp | " | Pigment Red 122 supplied by Independent Ink, Inc, Gardena CA 90249 |
| $MC_3$ | Comp | " | Pigment Red 122 supplied by Graphic Utilities, San Jose CA 95131 |
| $MC_4$ | Comp | " | Brilliant Ink Pigment Red 122 supplied by Dataplot CAD CAM Vertriebsgesellschaft mb, Henstedt-Ulzburg, Germany |
| $MC_5$ | Comp | " | DuraInk Pigment Red 122 supplied by Ahearn and Soper Co., Inc, Manchester NH 03101 |
| $Y_1$ | — | Yellow | Ohta optimum yellow colorant |
| $Y_2$ | — | " | CI Yellow supplied by Independent Ink, Inc, Gardena CA 90249 |
| $Y_3$ | — | " | CI Yellow supplied by Graphic Utilities, San Jose CA 95131 |
| $Y_4$ | — | " | Brilliant Ink CI Yellow supplied by Dataplot CAD CAM Vertriebsgesellschaft mb, Henstedt-Ulzburg, Germany |
| $Y_5$ | — | " | DuraInk CI Yellow supplied by Ahearn and Soper Co., Inc, Manchester NH 03101 |
| $Y_6$ | — | " | Pigment Yellow 74 as 11-2510 Hansa Brilliant Yellow 5GX supplied by Hoechst Chemical Co |

In the Table, the first letter represents the color Cyan, Magenta, or Yellow. For the magenta samples, the second letter indicates Inventive or Comparative, where appropriate. The subscript indicates the sample number of that color and type. The usable cyan pigment was aluminophthalocyanine or copper phthalocyanine (Color Index or "CI" Pigment Blue 15); the comparative and inventive magenta pigments were quinacridone or "CI" pigment red 122; and the tested yellow pigments were non-benzidine compounds such as "CI" Yellow Pigments 74, 138, 139, 154, 180, or 185, and mixtures thereof. The normalized transmission densities of the pigments tested at the wavelengths pertinent to the invention are shown in Tables IIA and IIB.

The spectral absorption curve of each colorant was measured using a MacBeth Model 2145 Reflection Spectrophotometer having a Xenon pulsed source and a 10 nm nominal aperture. Reflection measurements were made over the wavelength range of 380–750 manometers using a measurement geometry of 45/0, and the characteristic vector (transmission density -vs- wavelength) for each pigment specimen was calculated. The color gamuts resulting from using the characteristic vectors to calculate the gamut using the methods as described in J. Photographic Science, 38, 163 (1990) were determined and the results are given in Table III. Color gamuts are obtained by the above calculation method, assuming the use of "Heavy Weight Photographic Quality Ink Jet Paper" sold by Eastman Kodak Co, no light scatter, a D5000 viewing illuminant, and a Dmax of 2.2 status A. The same relative results are found if color gamuts are obtained by a different method and the optimal spectra regions hold true for any Drain, any amount of flare, any Dmax and any viewing illuminant.

In order to determine the spectral characteristics of a given pigment, the following ingredients were added to a 1-liter, water-cooled vessel:

300 g of polymeric beads, mean diameter of 50 μm (milling media)

200 g de-ionized water (liquid carrier medium)

16 g of N-methyl-N-oleyl taurate (OMT; dispersant)

40 g sample pigment

The mixture was milled for 4 hr at 7000 rpm using a "Cowles"-type dispersing blade (40 mm diameter). The mill grind was then separated from the grinding media by passing it through a 15-μm filter. The mill grind was then diluted to a working strength ink with the following final composition:

25.6 weight percent mill grind (4 weight percent pigment)

5 weight percent diethylene glycol 5 weight percent glycerol 0.3 weight percent Pluronic F-68 surfactant de-ionized water to 100 weight percent The resulting ink was filtered through a 3-μm filter, and the filtrate was introduced into an ink jet printhead suitable for use in a Hewlett-Packard DeskJet® 540C ink jet printer. Test images comprising patches of varying densities or percentage coverages of the ink, including 100% coverage (Dmax) were printed on a glossy ink jet paper sold by Eastman Kodak Co. as "Heavy Weight Photographic Quality Inkjet Paper". These images were used to measure the distribution spectra. A characteristic absorption curve for each ink was then determined from the reflection distribution spectra and normalized to a peak of 1.0 in transmission density space. Using this methodology, the various pigments tested had spectral curves having normalized transmission densities at the indicated wavelengths as shown in the following tables.

TABLE IIA

Magenta Density Values At Indicated Wavelength

| Magenta Pigment | Type | Preferred Range | | | Inventive Range | |
|---|---|---|---|---|---|---|
| | | D500 | D510 | D520 | D540 | D560 |
| | | 0.25–0.79 | 0.25–0.86 | 0.25–0.93 | 0.9–1.0 | 0.9–1.00 |
| $MI_1$ | Inv | 0.55 | 0.68 | 0.85 | 0.97 | 1.00 |
| $MC_1$ | Comp | 0.59 | 0.74 | 0.88 | 1.0 | 0.85 |
| $MC_2$ | Comp | 0.89 | 0.93 | 0.96 | 0.98 | 0.99 |
| $MC_3$ | Comp | 0.86 | 0.94 | 1.00 | 0.95 | 0.97 |
| $MC_4$ | Comp | 0.87 | 0.92 | 0.96 | 0.99 | 0.95 |
| $MC_5$ | Comp | 0.88 | 0.93 | 0.97 | 0.99 | 0.98 |

Table IIA shows that only the magenta pigment $MI_1$ falls within the inventive normalized transmission density range for 520, 540, and 560 nm. The inventive magenta falls within the preferred ranges at 510 and 500 nm as well. None of the comparison pigments is within the prescribed range at 520, 540, and 560 nm.

TABLE IIB

Yellow Density Values At Indicated Wavelength

| Yellow Pigment Typical Ranges | Density at 450 nm 0.9–1.0 | Density at 470 nm 0.8–1.0 | Density at 490 nm 0.5–0.9 (0.5–0.8 preferred) |
|---|---|---|---|
| $Y_1$ | 1.00 | 0.78 | 0.43 |
| $Y_2$ | 0.99 | 0.97 | 0.87 |
| $Y_3$ | 0.98 | 0.96 | 0.71 |
| $Y_4$ | 0.97 | 0.91 | 0.71 |
| $Y_5$ | 0.99 | 0.98 | 0.77 |
| $Y_6$ | 0.99 | 0.97 | 0.53 |

TABLE III

Color Gamut Values

| Sample | Type | Colorant Set | Gamut - Color Space Volume |
|---|---|---|---|
| 1 | Comp | $C_2/MC_2/Y_2$ | 45,776 |
| 2 | Comp | $C_2/MC_1/Y_2$ | 52,317 |
| 3 | Inv | $C_2/MI_1/Y_2$ | 58,217 |
| 4 | Comp | $C_3/MC_3/Y_3$ | 54,370 |
| 5 | Comp | $C_3/MC_1/Y_3$ | 57,278 |
| 6 | Inv | $C_3/MI_1/Y_3$ | 63,115 |
| 7 | Inv | $C_3/MI_1/Y_3/B$ | 66,455 |
| 8 | Comp | $C_4/MC_4/Y_4$ | 47,955 |
| 9 | Comp | $C_4/MC_1/Y_4$ | 52,641 |
| 10 | Inv | $C_4/MI_1/Y_4$ | 57,501 |
| 11 | Comp | $C_5/MC_5/Y_5$ | 49,070 |
| 12 | Comp | $C_5/MC_1/Y_5$ | 51,838 |
| 13 | Inv | $C_5/MI_1/Y_5$ | 57,955 |
| 14 | Inv | $C_2/MI_1/Y_6$ | 61,930 |

In Table III, the color gamut values were obtained using the cyan and yellow pigment combinations commercially employed by four different suppliers of ink jet pigments. For each of the commercial combinations of a cyan and a yellow pigment, either the comparative ink jet supplier's magenta, the magenta of the Ohta publication cited in the background ($MC_1$), or the inventive magenta ($MI_1$) were alternatively employed with the particular cyan and yellow pigment combination and the gamut was determined. The data of Table III show that the inventive magenta colorant provided a superior gamut. The first "CC" in each set represents the suppliers current magenta pigment while the "$CC_1$" in each set represents a substitution of the "optimum" magenta colorant of the Ohta publication for the magenta colorant of the supplier. The data shows that samples 3, 6, 10, and 13, where the magenta of the invention is employed, exhibit superior color gamut. In every instance, the obtainable gamut is greatest for the magenta colorant having the spectral curve of the invention. The black ink was supplied by Graphic Utilities as a carbon black-based pigment believed to be Pigment Black 7. Even better results are obtained in accordance with Sample 7 where the achromatic black pigment is employed.

Finally, a comparison of Samples 3 and 14 shows a further improvement in gamut using the preferred yellow pigment of the invention.

The entire contents of the various patent applications, patents and other publications referred to in this specification are incorporated herein by reference.

What is claimed is:

1. An ink jet pigment set comprising a magenta pigment, a yellow pigment, and a cyan pigment wherein the normalized spectral transmission density distribution curve of the magenta pigment has a density between 0.25 and 0.93 at 520 nm, a density between 0.9 and 1.0 at 540 nm, and a density between 0.9 and 1.0 at 560 nm.

2. The pigment set of claim 1 wherein the distribution curve of the magenta pigment also has a density between 0.25 and 0.86 at 510 nm.

3. The pigment set of claim 2 wherein the distribution curve of the magenta pigment also has a density between 0.25 and 0.79 at 500 nm.

4. The pigment set of claim 1 additionally comprising an achromatic pigment.

5. The pigment set of claim 2 additionally comprising an achromatic pigment.

6. The pigment set of claim 3 additionally comprising an achromatic pigment.

7. The pigment set of claim 1 wherein the yellow pigment exhibits a normalized spectral transmission density distribution curve which has a transmission density of between 0.9 and 1.0 at 450 nm and a density between 0.8 and 1.0 at 470 nm.

8. The pigment set of claim 2 wherein the yellow pigment exhibits a normalized spectral transmission density distribution curve which has a transmission density of between 0.9 and 1.0 at 450 nm and a density between 0.8 and 1.0 at 470 nm.

9. The pigment set of claim 3 wherein the yellow pigment exhibits a normalized spectral transmission density distribution curve which has a transmission density of between 0.9 and 1.0 at 450 nm and a density between 0.8 and 1.0 at 470 nm.

10. The pigment set of claim 7 additionally comprising an achromatic pigment.

11. The pigment set of claim 8 additionally comprising an achromatic pigment.

12. The pigment set of claim 9 additionally comprising an achromatic pigment.

13. The pigment set of claim 4 wherein the normalized spectral transmission density distribution curve of the yellow pigment also has a density of between 0.5 and 0.9 at 490 nm.

14. An ink jet cartridge comprising a pigment set in accordance with claim 1.

15. An ink jet cartridge comprising a pigment set in accordance with claim 4.

16. An ink jet cartridge comprising a pigment colorant set in accordance with claim 7.

17. An ink jet cartridge comprising a pigment colorant set in accordance with claim 10.

18. An ink jet printing system comprising reservoirs containing the pigment set of claim 1.

19. An ink jet printing system comprising reservoirs containing the pigment set of claim 4.

20. An ink jet printing system comprising reservoirs containing the pigment set of claim 7.

21. An ink jet printing system comprising reservoirs containing the pigment set of claim 10.

* * * * *